United States Patent
Lee et al.

(10) Patent No.: US 9,645,789 B1
(45) Date of Patent: May 9, 2017

(54) SECURE MESSAGING

(71) Applicant: Amazon Technologies, Inc., Reno, NV (US)

(72) Inventors: Michael M. Lee, San Jose, CA (US); Nagendra Bage Jayaraj, Sunnyvale, CA (US)

(73) Assignee: Amazon Technologies, Inc., Reno, NV (US)

( * ) Notice: Subject to any disclaimer, the term of this patent is extended or adjusted under 35 U.S.C. 154(b) by 0 days.

(21) Appl. No.: 13/621,820

(22) Filed: Sep. 17, 2012

(51) Int. Cl.
| | |
|---|---|
| *G06F 7/04* | (2006.01) |
| *G06F 7/00* | (2006.01) |
| *G06F 17/00* | (2006.01) |
| *H04N 7/00* | (2011.01) |

(52) U.S. Cl.
CPC ............... *G06F 7/00* (2013.01); *G06F 17/00* (2013.01); *H04N 7/00* (2013.01)

(58) Field of Classification Search
CPC .................. H04W 12/06; H04L 9/3271; G06F 2221/2103; G06F 2221/2129
See application file for complete search history.

(56) References Cited

U.S. PATENT DOCUMENTS

| | | | | |
|---|---|---|---|---|
| 7,215,947 | B2* | 5/2007 | Dowling | H04L 12/1859 455/414.1 |
| 7,245,902 | B2* | 7/2007 | Hawkes | G06F 21/305 455/410 |
| 8,577,810 | B1* | 11/2013 | Dalit | G06F 21/32 705/1.1 |
| 8,813,248 | B2* | 8/2014 | Purvis | G06F 21/31 713/169 |
| 2002/0023131 | A1* | 2/2002 | Wu | H04L 12/581 709/205 |
| 2002/0116508 | A1* | 8/2002 | Khan | H04L 12/587 709/229 |
| 2003/0208543 | A1* | 11/2003 | Enete | H04L 12/1822 709/206 |
| 2007/0101010 | A1* | 5/2007 | Ellison | G06F 21/36 709/229 |
| 2011/0314529 | A1* | 12/2011 | Bailey, Jr. | G06F 21/36 726/7 |
| 2012/0144468 | A1* | 6/2012 | Pratt | G06F 21/40 726/7 |

(Continued)

*Primary Examiner* — Mohammad W Reza
*Assistant Examiner* — Khoi Le
(74) *Attorney, Agent, or Firm* — Polsinelli LLP

(57) ABSTRACT

Approaches are described for securely sending, receiving, or otherwise processing communications between electronic devices. A communication can be received at a computing device (such as a mobile phone). The communication can include information captured about a person initiating the communication such as an image of the user, voice data of the user, typing pattern information of the user, or any other information that can be used to identify the user generating the communication. The information can be compared against profile data (e.g., contact information such as a phone number or name of the sender) associated with or otherwise stored for an indicated sender of the communication to generate a confidence value, where the confidence value can be used to indicate that the person initiating the communication is the indicated sender.

24 Claims, 7 Drawing Sheets

(56) References Cited

U.S. PATENT DOCUMENTS

| | | | |
|---|---|---|---|
| 2012/0198005 A1* | 8/2012 | DeLuca | G06Q 10/107 709/206 |
| 2012/0311342 A1* | 12/2012 | Nuzzi | G06F 21/31 713/182 |
| 2013/0198862 A1* | 8/2013 | Guo | G06F 21/316 726/28 |
| 2013/0227651 A1* | 8/2013 | Schultz | G06F 21/32 726/4 |
| 2014/0063239 A1* | 3/2014 | Furness, III | G01N 21/31 348/143 |

* cited by examiner

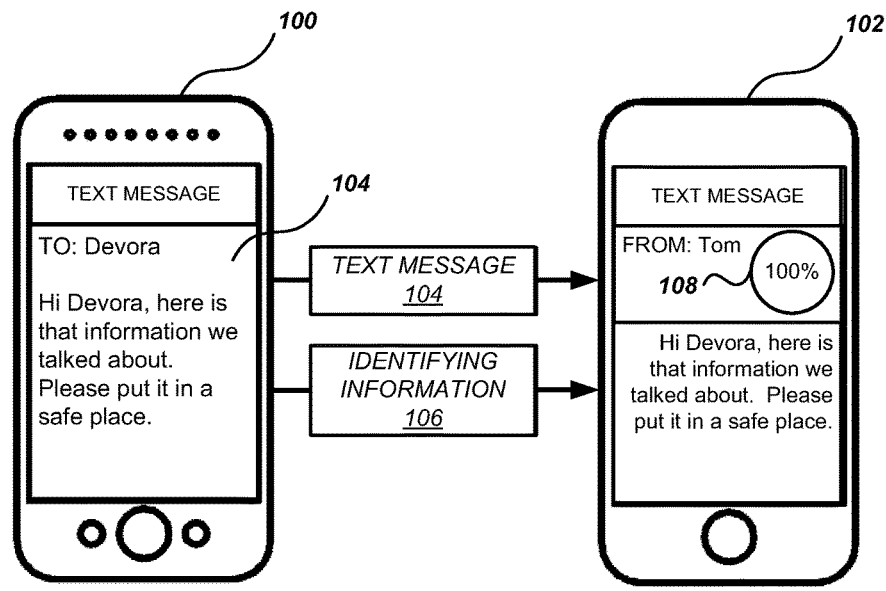
*FIG. 1A*
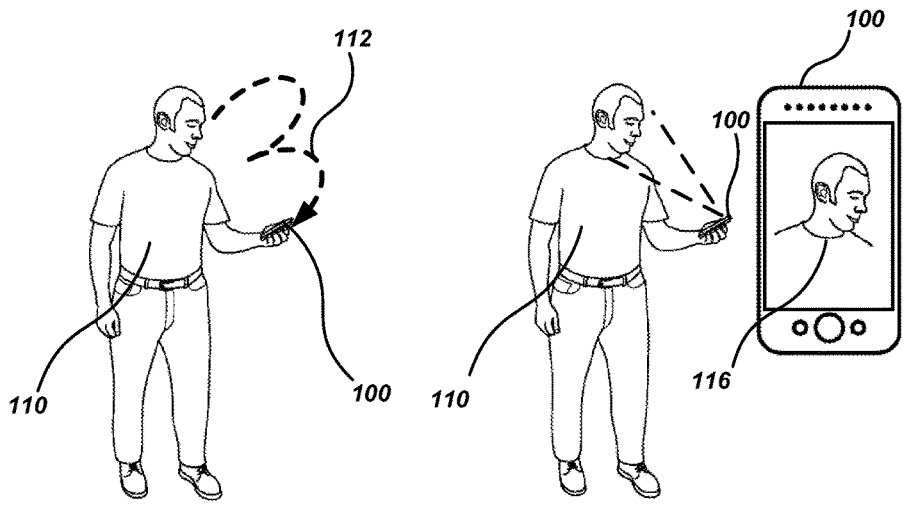
*FIG. 1B*  *FIG. 1C*

SECURE MESSAGING

BACKGROUND

As people utilize a variety of computing devices, it can be advantageous to adapt to the ways in which people interact with these devices. For example, communication between portable devices via text messaging is a common method of communication. However, there is no way of knowing whether the person initiating the message is the intended sender of the message. Likewise, there is no way of knowing whether a person actually receiving and viewing a message is the intended recipient of the message.

BRIEF DESCRIPTION OF THE DRAWINGS

Various embodiments in accordance with the present disclosure will be described with reference to the drawings, in which:

FIGS. 1A-1C illustrate an example implementation for communicating secure messages between computing devices, in accordance with an embodiment;

DETAILED DESCRIPTION

Figure 2A:
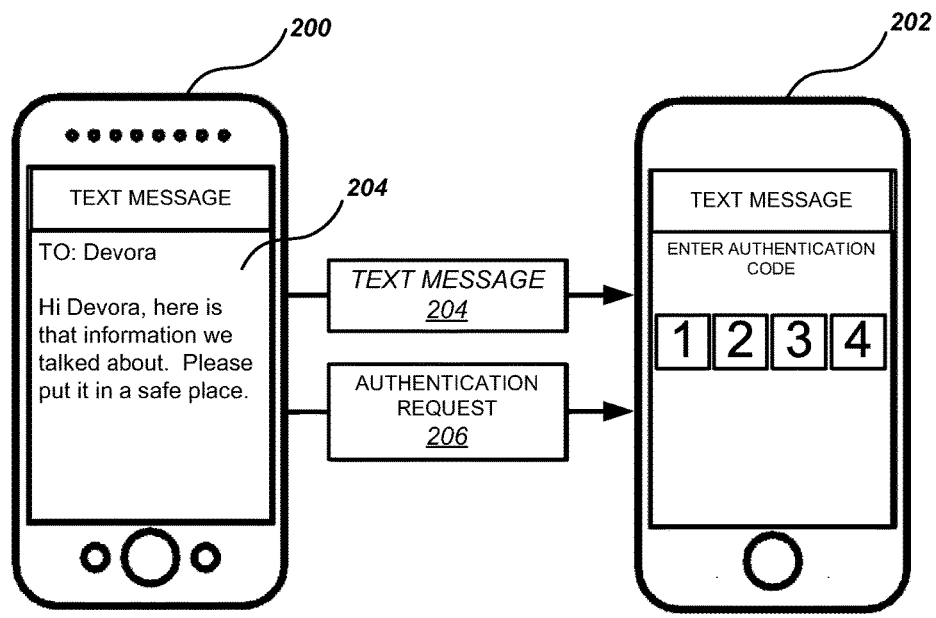
FIGS. 2A-2B illustrate an example implementation where a person receiving a communication is prompted to authenticate their identity to display the communication, in accordance with an embodiment.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the foregoing or other deficiencies experienced in conventional approaches for sending, receiving, or otherwise processing communications between electronic devices. In particular, various embodiments enable a computing device (e.g., a mobile phone) to generate a confidence value or other such metric that indicates that a confidence or likelihood that a person generating or receiving a communication (e.g., a text message) is an intended sender or recipient of the communication.

In accordance with various embodiments, a communication (e.g., a text message, email, instant message, chat message, etc.) can be received at a computing device (such as a mobile phone). The communication can include information captured about a person initiating the communication such as an image of the user, voice data of the user, typing pattern information of the user, or any other information that can be used to identify the user generating the communication. The information can be compared against profile data (e.g., contact information such as a phone number or name of the sender) associated with or otherwise stored for an indicated sender of the communication to generate a confidence value, where the confidence value can be used to indicate how likely it is, based at least in part upon the provided information, that the person actually generating the communication, or at least causing the communication to be sent, is the indicated sender.

For example, when a text message is received at a mobile phone, the text message and the name of the person who generated the text message can be displayed on a display element of the mobile phone, where the displayed name indicates the person who generated the text message. However, in some instances, a text message (or other communication) can be composed by one person but appear sent from another person. For example, person A sends a text message to person C from person B's mobile phone. Person C's mobile phone would indicate that the text message was generated by person B (i.e., because the text message was sent from person B's mobile phone), and person C would believe they were in communication with person B when instead they were in communication with person A.

Using conventional approaches, there is no way to determine that the sender of the text message is the sender as indicated by the recipient's phone. However, in accordance with an embodiment, the text message can be authenticated using an authentication process, where the authentication process can generate a metric that indicates a confidence value for the text message. The mobile phone can display the text message along with a graphical indication (e.g., a percentage or other visual representation) that denotes how likely the person sending the text message is the expected sender of the text message.

FIGS. 1A-1C illustrate an example implementation for communicating secure messages between computing devices, in accordance with an embodiment. As shown in FIG. 1A, a first portable computing device 100 is in communication with a second portable computing device 102. The portable computing device can be a mobile phone, tablet computer, or other device that can be operated by a user, and can be used to send text messages or other communications such as voice, video, MMS, etc. It should be understood that computing devices not generally considered to be "portable" devices can be used as well within the scope of the various embodiments.

The second portable computing device 102 in this example can receive a communication 104 (e.g., a text message or other communication) from the first portable computing device 100, where the communication can include or otherwise have associated therewith identifying information 106 captured about a person initiating the communication. For example, the text message 104 or other communication can include or otherwise have associated therewith an image, voice data, typing pattern information such as a gesture, or other information that can be used to identify the person initiating the communication. In accordance with at least one embodiment, the information can be obtained immediately before or after, or otherwise obtained around the same time as sending the communication.

For example, conventionally, when a text message is received at portable computing device, the device can display the text message and the phone number of the sending device. In the case where the receiving portable computing device includes profile data (e.g., a name or other information) associated with the sender of the text message, the profile data (such as the name of the sender) can be displayed on a display element of receiving portable computing device along with the text message, where the displayed name indicates the person who generated the text message. In accordance with at least one embodiment, any of the portable computing devices can have stored thereon other profile data for one or more profiles, such as pictures, gestures (e.g., data that indicates a particular movement of a portable computing device), voice data, etc.

Returning to FIG. 1A, when the text message 104 is received at the second portable computing device 102, the second computing device can compare the identifying information 106 against profile data (e.g., contact information such as a phone number or name of the sender) associated with or otherwise stored for an indicated sender of the communication to generate a confidence value that indicates that the person initiating the communication is the indicated sender. For example, in the case where the profile data captured about a person initiating the communication is a picture, the captured picture can be compared with a stored picture of the person using, e.g., facial recognition software or other software to determine a similarity between the pictures. The more similar the pictures, the higher the confidence value, and the less similar the pictures, the lower the confidence value.

The person sending the text message 104 can further be authenticated or otherwise verified using an authentication process based at least in part on the confidence value to provide a metric that indicates a confidence or likelihood that a person initiating the text message is an intended sender of the text message 104. For example, the authentication process can include additional information (such a location of the person sending the text message) that can be used to further authenticate, identify or otherwise verify the person initiating the communication (or in other instances can be used to further identify the person receiving the communication). The additional information can have associated therewith importance factors such as a numerical weight, where the confidence value, along with the weighted additional information, can be used to provide the metric.

The text message 104 and a graphical indication 108 (e.g., a percentage value, color or other visual representation) that denotes the confidence value (or in other instances the metric) can be displayed on a display element of the second computing device 102. Thereafter, the user of the second portable computing device 102 can request additional information to authenticate the person initiating the text message 104, or continue corresponding with the person of the first portable computing device 100.

For example, in accordance with an embodiment, if the confidence value (or metric) is below a predetermined threshold, the person initiating the communication can be automatically prompted to send another picture (i.e., a picture from a different angle or a picture taken under better lighting conditions). Additionally or alternatively, if the confidence value (or metric) is below the predetermined threshold, the person initiating the communication can be prompted to send other information (such as a gesture, biometric data, voice) to be used in the authentication process to generate a new confidence (or metric) value.

In the situation where the confidence value (or metric) is above the predetermined threshold (and thus, the second portable computing device does not automatically prompt the person initiating the communication to send additional information), the person receiving the communication can do nothing, or request additional and/or a subsequent submission of the information captured about the person initiating the communication. Alternatively, in any of the situations, the determination on whether to prompt the person initiating the communication to send additional information, and/or to provide a subsequent submission of the captured information, is determined by the person receiving the communication regardless of the value of the confidence value (or metric).

In accordance with an embodiment, the value displayed by the graphical indication can be modified (or otherwise influenced) by other factors to display a modified value, where the factors or variables can include location information associated with the person initiating the communication, and or other information that can be used to identify the person initiating the text message or other communication. For example, the second portable computing device 102 can include profile data that includes location information such as a home address, a work address or other location information associated with the person initiating the text message. The text message 104 can be received at the second portable computing device 102, where the text message can include location information in addition to the information captured about the person initiating the communication (e.g., a picture). As described above, a confidence value can be generated based on the picture, and in accordance with an embodiment, the confidence value can be increased or decreased based on the location of the person initiating the text message.

For example, if the location information of the person initiating the text message matches a location in the profile information on the second portable computing device 102, then the confidence value can be increased. Likewise, if the location information is different from the location(s) in the profile information, then the confidence value can be decreased. Additionally or alternatively, the confidence value can be adjusted on a sliding scale, where the confidence value can be modified based on a distance value calculated between a location determined from the location information of the person initiating the text message and the location(s) in the profile information, where the confidence value can be increased the smaller the distance value (or decreased the larger the distance value). In the situation where there is more than one location in the profile information for the person initiating the text message, the distance value used to modify the confidence value can be the smallest distance value determined from the locations.

It should be noted that although the calculated distance between the location information received from the person initiating the communication and the location(s) in the profile information was used to modify the confidence, the various embodiments described herein are not limited to this information type. Other information can be used to modify the confidence value, as will be evident to one or ordinary skill in the art, such as calendar information, where when the captured (or otherwise shared) calendar information of the person initiating the communication matches calendar information stored on (or otherwise retrieved) the second portable computing device, the confidence value can be increased.

In accordance with an embodiment, the confidence value can be modified or replaced with a baseline confidence value that is based on a plurality of received confidence values. For example, in some instances, captured information (such as a picture) can generate a confidence value that is below a threshold or otherwise indicates that the person actually generating the communication, or at least causing the communication to be sent, may not be the indicated sender when in fact the person generating the communication is the indicated sender. This can be because, e.g., the image capture mechanism of the computing device generating the communication captures poor quality pictures, and since the poor quality pictures are used to generate a confidence value (e.g., by comparing the picture against corresponding profile data stored for the indicated sender), the confidence value may not accurately indicate whether the person initiating the communication is the indicated sender.

However, in accordance with various embodiments, when a plurality of communications are received from the same computing device, and the captured information is of the same type (e.g., the captured information is a picture), a baseline confidence value that indicates an expected confidence value can be used instead of a generated confidence value, where the baseline confidence value can be an average, median value, or some other representation of a plurality of confidence values generated under substantial the same conditions (i.e., using the same device to capture pictures that are then used to generate the confidence values). In this way, the baseline confidence value acts as an adaptive threshold by providing a baseline that can account for captured information that does not result in a confidence value that accurately indicates the person initiating the communication (e.g., due to poor image quality). Thereafter, the display element of the computing device can display an indication of the communication and an element indicative of the baseline confidence value.

As described above, the communication (e.g., the text message) can include or otherwise have associated therewith identifying information 106 captured about a person initiating the communication. FIG. 1B illustrates an example implementation where information is captured about a person who is generating the text message. As shown in FIG. 1B, a person 110 is attempting to send a text message, and before sending the text message, information about the person in captured. In this situation, the captured information is a gesture 112. The text message and the captured gesture 112 are communicated to a mobile device (e.g., second portable computing device 102), and when the text message and gesture is received at the mobile device, the mobile device can generate a confidence value by comparing the gesture 112 against gesture information stored for the person 110 generating the text message.

Additionally or alternatively, the identifying information captured for the person initiating the text message can be a picture of the person 110. For example, as shown in FIG. 1C, a picture 116 of the person 110 can be captured, and the picture 116 (along with the text message or other communication) can be received at a mobile device (e.g., the second portable computing device 102). As described above, the mobile device can generate a confidence value by comparing the picture 116 against a picture stored for the person initiating the text message. Thereafter, the text message can be authenticated using an authentication process to generate a metric, and the text message and a graphical indication that denotes the confidence value can then be displayed on a display element of the mobile device.

Figure 2B:
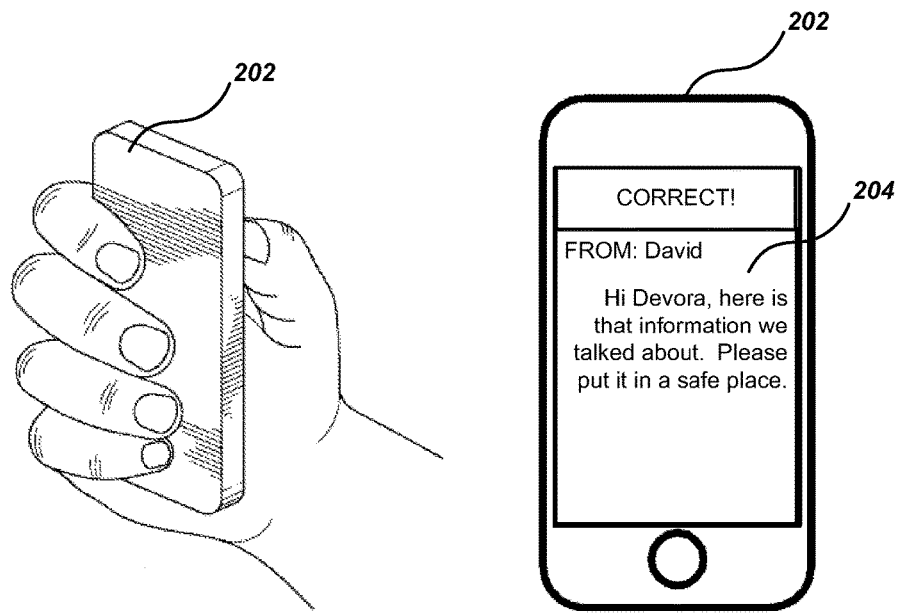

FIGS. 2A-2B illustrate an example implementation where a person receiving a communication is prompted to authenticate their identity in order to display the communication, in accordance with an embodiment. As shown in FIG. 2A, a first portable computing device 200 is in communication with a second portable computing device 202, where the first portable computing device 200 is communicating a text message 204 and an authentication request 206 to the second portable computing device 202. The authentication request 206 in this example can require the second portable computing device 202 to enter a pin code, provide user specific identification information, or respond to some other authentication method in order to view the text message 204. For example, the other authentication methods can require a person to answer a secrete question, perform a gesture, provide biometric data, or provide some other input, data, or action in addition to (or instead of) the pin code in order to view the text message 104.

As shown in FIG. 2B, the user of the second portable computing device 202 provides a pin code. Thereafter, if the pin code is accepted, the text message 204 can be displayed on the second portable computing device 202. In accordance with an embodiment, rules or other policies can be implemented that dictate whether the second portable computing device 202 is required to enter a pin code or other code in order to view the text message 204. For example, a rule can be established where only text messages sent during a particular time of day require a pin code. Additionally or alternatively, a rule can be established where a pin code is required to view the text message 204 based on a location of the second portable computing device 202, where a pin code can required when the second portable computing device 202 is outside a particular location (or inside a particular location). Other rules can also be established, such as a rule that requires each received communication to be authenticated, a rule that requires only communications from a particular sender to be authenticated, etc.

Figure 3:
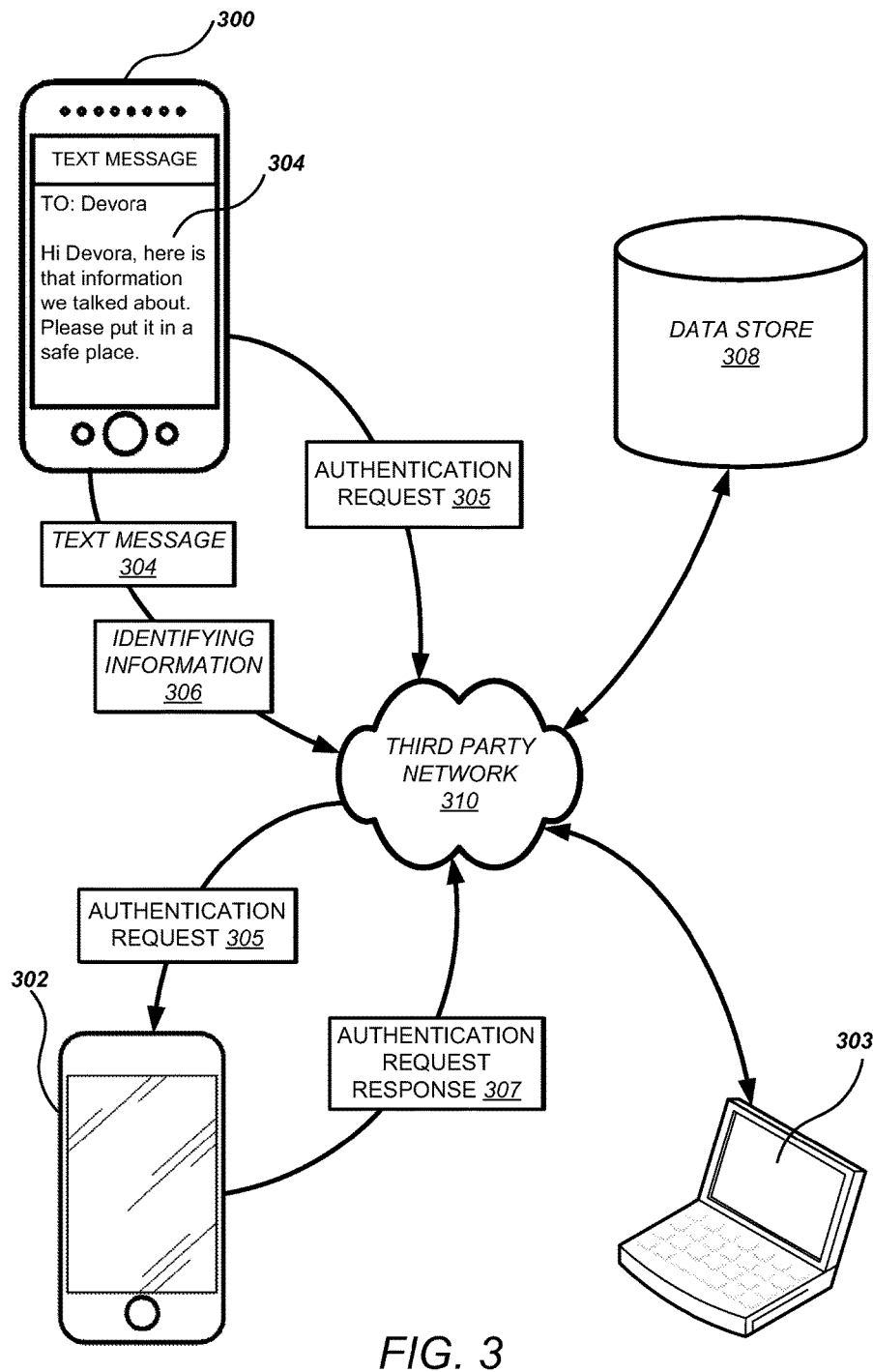
FIG. 3 illustrates an example implementation for sending secure communications between computing devices, in accordance with an alternate embodiment.

FIG. 3 illustrates an example implementation for sending secure communications between computing devices, in accordance with an embodiment. As shown in FIG. 3, a pair of portable computing devices (300, 302) and a personal computing device 303 (e.g., a laptop, desktop, tablet or other personal computing device) communicate through a third party network 310. It should be noted that although three devices are shown, more or fewer devices can be in communication, where the devices can be any electronic device that can send and/or receive communications from other electronic devices.

The devices (300, 302, 303) in this example can communicate a communication 304 (e.g., a text message or other communication) to the third party network 310, where the third party network 310 can be used to deliver the communication 304 to one of the devices (300, 302, 303). The communication can include or otherwise have associated therewith information captured about a person initiating (or receiving) the communication. For example, as described above, the communication can be a text message and can include identifying information 306 used to identify the person initiating the communication 304, where the identifying information 306 can include, e.g., an image, voice data, typing pattern information (such as a gesture), or other information that can be used to identify the person initiating the communication.

The third party network 310 in this example can store profile information such as phone numbers, email addresses, pictures, location information, and/or other information that can be used to identify a person initiating (or receiving) a communication. It should be noted that other profile information can be stored in the third party network 310, such as calendar information from a calendaring system, social network information, web browser information, employee information such as employee identification numbers and employee pictures, or any other information that can be used to identify a sender or recipient of a communication. Additionally or alternatively, the third party network 310 can store and/or retrieve profile information and/or other information in a remote location such as a data store 308.

The third party network 310 can be any network that can communicate and process communications received from electronic devices. For example, the third party network 310 can compare information captured (e.g., a picture) from a device generating a communication against profile data (e.g., contact information such as a phone number or name or a person initiating or receiving a communication) for the person initiating the communication to generate a confidence value that can be used to indicate that the person initiating the communication is the intended sender. Thereafter, the confidence value can be communicated to the recipient of the communication, where the communication can be authenticated using an authentication process based at least in part on the confidence value. As described above, the authentication process can provide a metric that indicates a confidence value, and the communication and a graphical indication (e.g., a percentage value or other visual representation) that denotes the confidence value can be displayed on a display element of the recipient's computing device.

Alternatively, in accordance with an embodiment, the communication can be authenticated at the third party network in the manner as described above or a similar manner and the graphical indication can be communicated to the portable computing device intended to receive the communication.

In accordance with at least one embodiment, the first portable computing device 300 can request that a user of the second portable computing device 302 authenticate their identify before the communication 304 is delivered. For example, the first portable computing device 300 can communicate an authentication request 305 to the second portable computing device 302 through the third party network 310. The authentication request 305 can request that the user of the second portable computing device 302 respond to the request by communicating a picture (or other information) that can be used to identify and authenticate the user of the second portable computing device 302.

The response to the authentication request 307 (i.e., the requested picture of the user of the second portable computing device 302) can be received at the third party network 310. The third party network in this example can include pictures of the user of the second portable computing device; where, in accordance with an embodiment, the pictures can be retrieved from social networking sites, employer or other sites, from a registration process that required the user submit a picture, public records pulled from a database of public records, etc.

The third party network 310 can compare the picture with a stored picture of the user of the second portable computing device 302 to generate a confidence value based on a similarity between the pictures, where the more similar the pictures, the higher the confidence value, and the less similar the pictures, the lower the confidence value. The user of the second portable computing device can then be authenticated based at least in part on the confidence value, where the authentication process can generate a metric that indicates a confidence value or other such metric that indicates a confidence or likelihood that the person receiving a the text message is an intended recipient of the text message. The metric can be communicated to the first portable computing device 300, and based on the metric, a graphical indication (e.g., a percentage value or other visual representation) that denotes the confidence value can be displayed on a display element of the first portable computing device 300. It should be noted that the third party network 310 can perform the authentication process, where the third party network can generate the graphical indication, and communicate the graphical indication to the first portable computing device 300 for display.

In accordance with at least one embodiment, also displayed on the display element of first portable computing device 300 can be options to send the communication to the second portable computing device 302, cancel sending the communication, or request additional information to authenticate the user of the second portable computing device 302.

Selecting the option to "send the communication" sends the communication to the second portable computing device 302, selecting the option to "cancel the communication" can end the communication and can further communicate a message to the second portable computing device 302 that displays that the authentication has failed, and selecting the option "request additionally authentication information" can prompt the second portable computing device 302 to send another picture. Additionally or alternatively, selecting "request additionally authentication information" can send to the second portable computing device 302 one or more other authentication request options that the user of the second portable computing device can perform to in order for the user to authenticate their identity. For example, one of the options can prompt the user of the second portable computing device 302 to provide a pin code, where when the pin code is entered correctly, the communication can be delivered to the second portable computing device 302.

As described above, other information such as an email can be communicated to the devices using the third party network 310. For example, in accordance with an embodiment, the first portable computing device 300 can communicate an email to a personal computing device 303 using the third party network 310. Additionally, the first portable computing device 300 can request that the user of the personal computing device 303 authenticate their identity before the email is communicated.

For example, the first portable computing device 300 can communicate an authentication request 305 to the third party network 310 that requests that the user of the personal computing device 303 communicate a picture that can be used to identify and authenticate the user of the personal computing device 303. The picture of the user of the personal computing device can be received at the third party network 310, where the third party network 310 includes other pictures of the user of the personal computing device 303.

The third party network 310 can compare the picture with a stored picture (e.g., a work picture or other picture) to generate a confidence value based on a similarity between the pictures. Thereafter, the third party network 310 can authenticate the user of the personal computing device 303 using an authentication process based at least in part on the confidence value, and other factors, such as when the picture was taken. The authentication process can provide a metric that indicates a confidence value, and a graphical indication (e.g., a percentage value or other visual representation) that denotes the confidence value. The graphical indication can be communicated to the first portable computing device 300, where based on the graphical indication, the first portable computing device 300 can communicate the email to the personal computing device 303.

In accordance with various embodiments, the email can be communicated automatically if the graphical indication denotes a value above a predetermined threshold, or in other embodiments, the decision whether to communicate the email can be a made on a case by case basis. Additionally, rules can be established that can be used to determine whether to communicate the email or any other communication. For example, one or more rules stored on the devices (or in the third party network), can limit the recipient of a communication, the time of day communications are automatically sent, include white lists, blacklists, or any other lists. As an example, a rule can be set that emails sent using the third party network 310 are only delivered to employees of a company regardless of who the email is addressed to.

Figure 4:
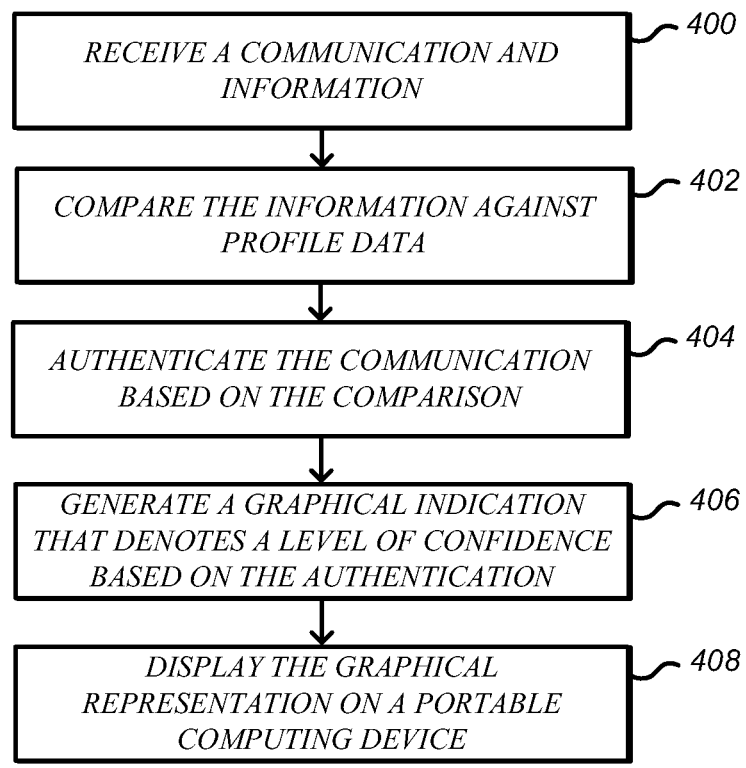
FIG. 4 illustrates an example process for sending secure communications between computing devices, in accordance with various embodiments.

FIG. 4 illustrates an example process for sending secure communications between computing devices, in accordance with various embodiments. It should be understood that, for any process described herein, that there can be additional or fewer steps performed in similar or alternative orders, or in parallel, within the scope of the various embodiments unless otherwise stated. At step 400, a second portable computing device receives a communication (e.g., a text message or other communication) from a first portable computing device, where the communication can include or otherwise have associated therewith information captured about a person initiating the communication. For example, a text message or other communication can include or otherwise have associated therewith an image, voice data, typing pattern information such as a gesture, or other information that can be used to identify the person initiating the communication.

At step 402, when the communication and information are received at the second portable computing device, the device can compare the information against profile data (e.g., contact information such as a phone number or name of the sender) stored for an indicated sender of the communication to generate a confidence value that indicates that the person initiating the communication is the indicated sender.

At step 404, the communication can be authenticated using an authentication process based at least in part on the confidence value to provide a metric that indicates a level of confidence for the communication. At step 406, a graphical indication (e.g., a percentage value or other visual indication) that denotes the confidence value can be determined based at least in part on the metric. For example, the graphical indication can indicate a confidence level of 100%, 0%, or some value between such as 60%. At step 408, the communication and the graphical indication can be displayed on a display element of the second portable computing device. Thereafter, the user of the second portable computing device can request additional information to authenticate the user generating the text message, or continue corresponding with the user without requesting additional information.

Figure 5:
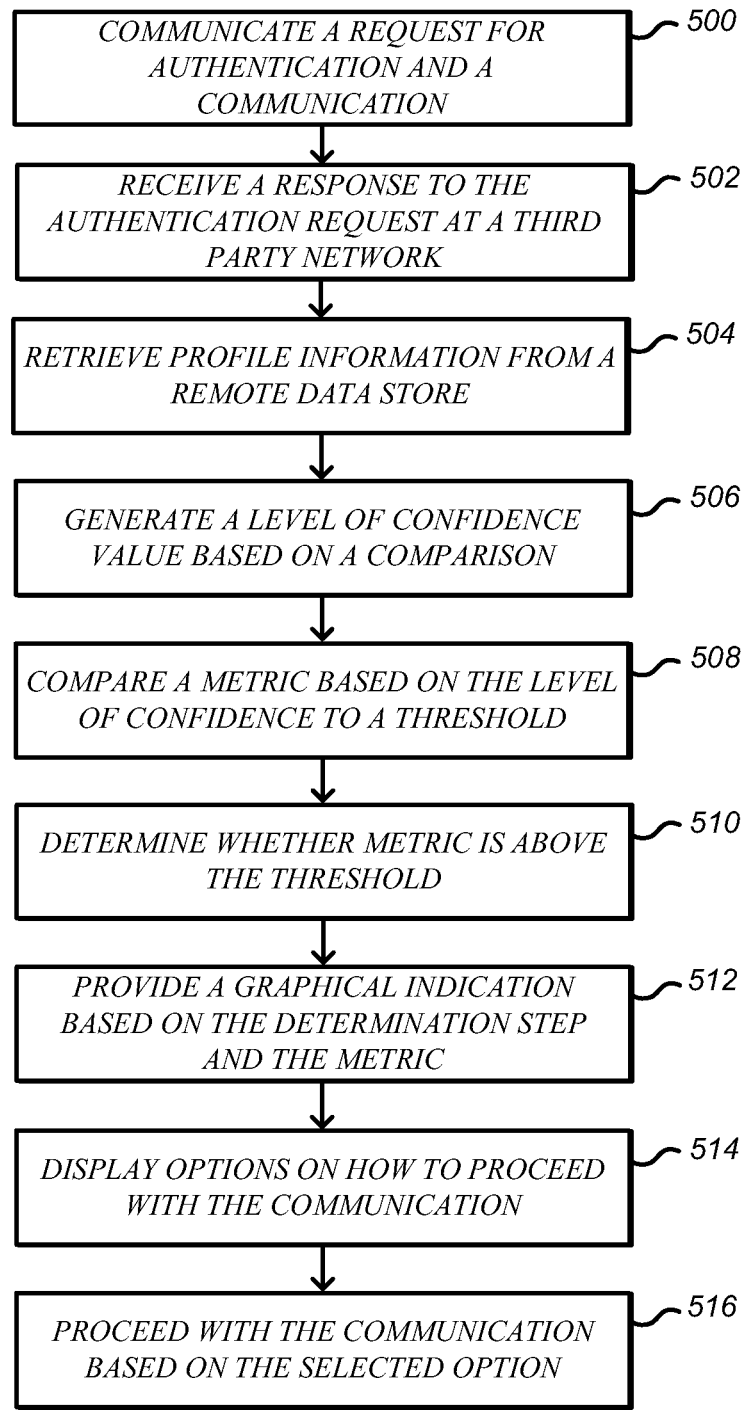
FIG. 5 illustrates an example process for sending secure communications between computing devices, in accordance with various embodiments.

FIG. 5 illustrates an example process for sending secure communications between computing devices, in accordance with various embodiments. At step 500, a first portable computing device communicates a request for authentication and a communication (e.g., a text message or other communication) to a third party network, where the third party network can be used to deliver the communication to a second portable computing device when the user of the device is authenticated. As described above, the communication can include or otherwise have associated therewith information captured about a person initiating (or receiving) the communication. The third party network can store profile information such as phone numbers, email addresses, pictures, location information, and/or other information that can be used to identify a person initiating (or receiving) the communication.

The authentication request in this example can request that the user of the second portable computing device communicate a picture that can be used to identify and authenticate the user. At step 502, the response to the authentication request (i.e., the request picture of the user) is received at the third party network. At step 504, the third party network retrieves profile information (e.g., a picture) of the user of the second portable computing device from a remote data store. In accordance with an embodiment, the remote data store can store pictures retrieved from social networking websites, employer websites, etc. At step 506, the third party network compares the picture with a stored picture of the user to generate a confidence value, and based on the confidence value, the third party network can generate a metric that indicates a level of confidence. At step 508, the metric is compared to a threshold value, where if the metric is below the threshold value, the third party network requests additional information used to authenticate the user.

At step 510, a determination is made that the value of the metric is above the threshold value, and at step 512, based on the determination and metric, a graphical indication (e.g., a percentage value or other visual representation) that denotes the level of confidence is provided to the portable computing device requesting the authentication. At step 514, the graphical indication is displayed on a display element of the first portable computing device. Also displayed on the display element of the first portable computing device are options to send the communication, cancel sending the communication, or request additional information to authenticate the user. At step 516, the option to "send the communication" is selected, and when the third party network receives the authorization to send the communication, the third party network communicates the communication to the second portable computing device.

Figure 6:
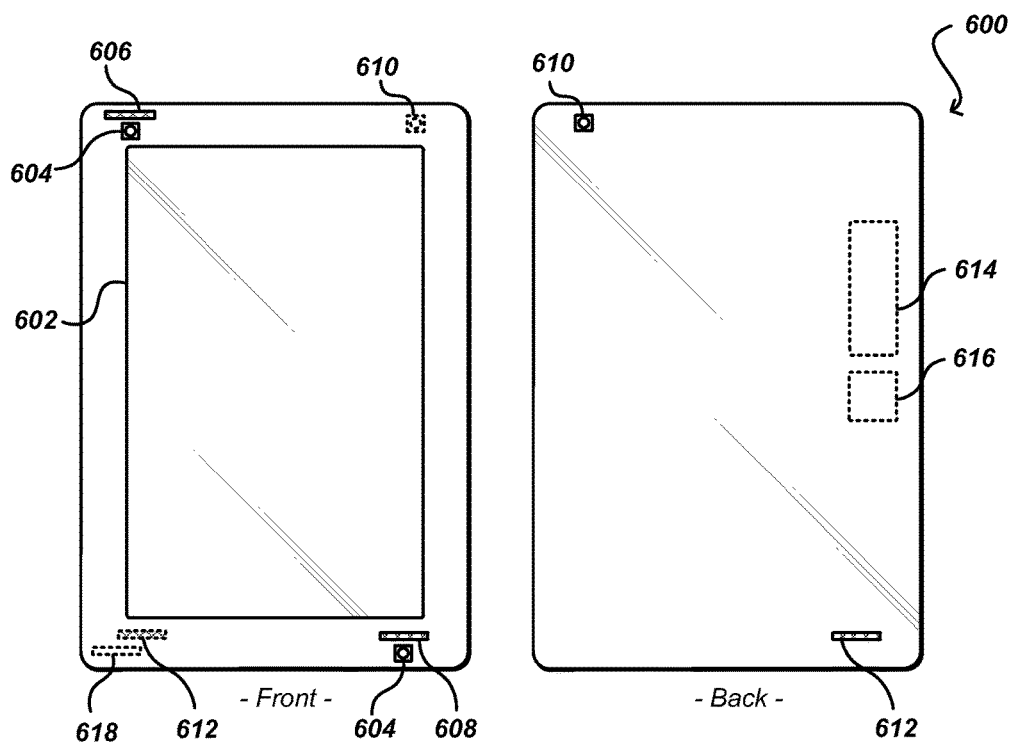
FIG. 6 illustrates front and back views of an example portable computing device that can be used in accordance with various embodiments.

FIG. 6 illustrates front and back views of an example portable computing device 600 that can be used in accordance with various embodiments. Although one type of portable computing device (e.g., a smart phone, an electronic book reader, or tablet computer) is shown, it should be understood that various other types of electronic devices that are capable of determining, processing, and providing input can be used in accordance with various embodiments discussed herein. The devices can include, for example, notebook computers, personal data assistants, cellular phones, video gaming consoles or controllers, and portable media players, among others.

In this example, the portable computing device 600 has a display screen 602 (e.g., a liquid crystal display (LCD) element) operable to display image content to one or more users or viewers of the device. In at least some embodiments, the display screen provides for touch or swipe-based input using, for example, capacitive or resistive touch technology. Such a display element can be used to, for example, enable a user to provide input by pressing on an area of the display corresponding to an image of a button, such as a right or left mouse button, touch point, etc. The device can also have touch and/or pressure sensitive material 610 on other areas of the device as well, such as on the sides or back of the device. While in at least some embodiments a user can provide input by touching or squeezing such a material, in other embodiments the material can be used to detect motion of the device through movement of a patterned surface with respect to the material.

The example portable computing device can include one or more image capture elements for purposes such as conventional image and/or video capture. As discussed elsewhere herein, the image capture elements can also be used for purposes such as to determine motion and receive gesture input. While the portable computing device in this example includes one image capture element 604 on the "front" of the device and one image capture element 610 on the "back" of the device, it should be understood that image capture elements could also, or alternatively, be placed on the sides or corners of the device, and that there can be any appropriate number of capture elements of similar or different types. Each image capture element may be, for example, a camera, a charge-coupled device (CCD), a motion detection sensor, or an infrared sensor, or can utilize another image capturing technology.

The portable computing device can also include at least one microphone 606 or other audio capture element capable of capturing audio data, such as may be used to determine changes in position or receive user input in certain embodiments. In some devices there may be only one microphone, while in other devices there might be at least one microphone on each side and/or corner of the device, or in other appropriate locations.

The device 600 in this example also includes at least one motion or position determining element 608 operable to provide information such as a position, direction, motion, or orientation of the device. These elements can include, for example, accelerometers, inertial sensors, electronic gyroscopes, electronic compasses, and GPS elements. Various types of motion or changes in orientation can be used to provide input to the device that can trigger at least one control signal for another device. The example device also includes at least one communication mechanism 614, such as may include at least one wired or wireless component operable to communicate with one or more portable computing devices. The device also includes a power system 616, such as may include a battery operable to be recharged through conventional plug-in approaches, or through other approaches such as capacitive charging through proximity with a power mat or other such device. Various other elements and/or combinations are possible as well within the scope of various embodiments.

Figure 7:
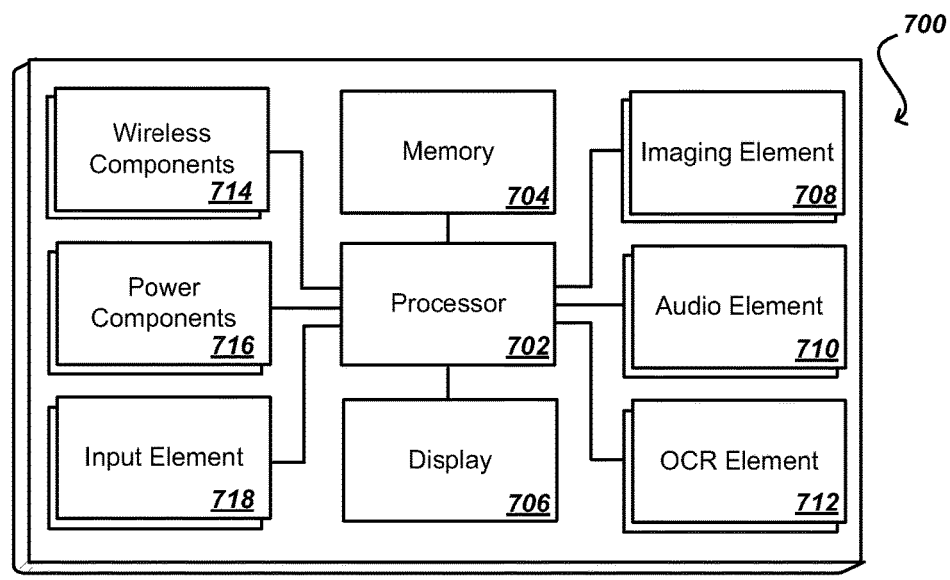
FIG. 7 illustrates an example set of basic components of a portable computing device, such as the device described with respect to FIG. 6.

In order to provide functionality such as that described with respect to FIG. 6, FIG. 7 illustrates an example set of basic components of a portable computing device 700, such as the device 600 described with respect to FIG. 6. In this example, the device includes at least one processor 702 for executing instructions that can be stored in at least one memory device or element 704. As would be apparent to one of ordinary skill in the art, the device can include many types of memory, data storage or computer-readable storage media, such as a first data storage for program instructions for execution by the processor 702, the same or separate storage can be used for images or data, a removable storage memory can be available for sharing information with other devices, etc.

The device typically will include some type of display element 706, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 708, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device. An image capture element also can be used to determine the surroundings of the device, as discussed herein. An image capture element can include any appropriate technology, such as a CCD image capture element having a sufficient resolution, focal range and viewable area, to capture an image of the user when the user is operating the device.

The device, in many embodiments, will include at least one audio element 710, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device. The device, as described above relating to many embodiments, may also include at least one optical character recognizer (OCR) element(s) 712 and various image prepossessing algorithms associated therewith.

The device can include at least one additional input device that is able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The example device also includes one or more wireless components 714 operable to communicate with one or more portable computing devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 716 known in the art for providing power to a portable computing device, which can include capacitive charging elements for use with a power pad or similar device as discussed elsewhere herein. The example device also can include at least one touch and/or pressure sensitive element 718, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 8:
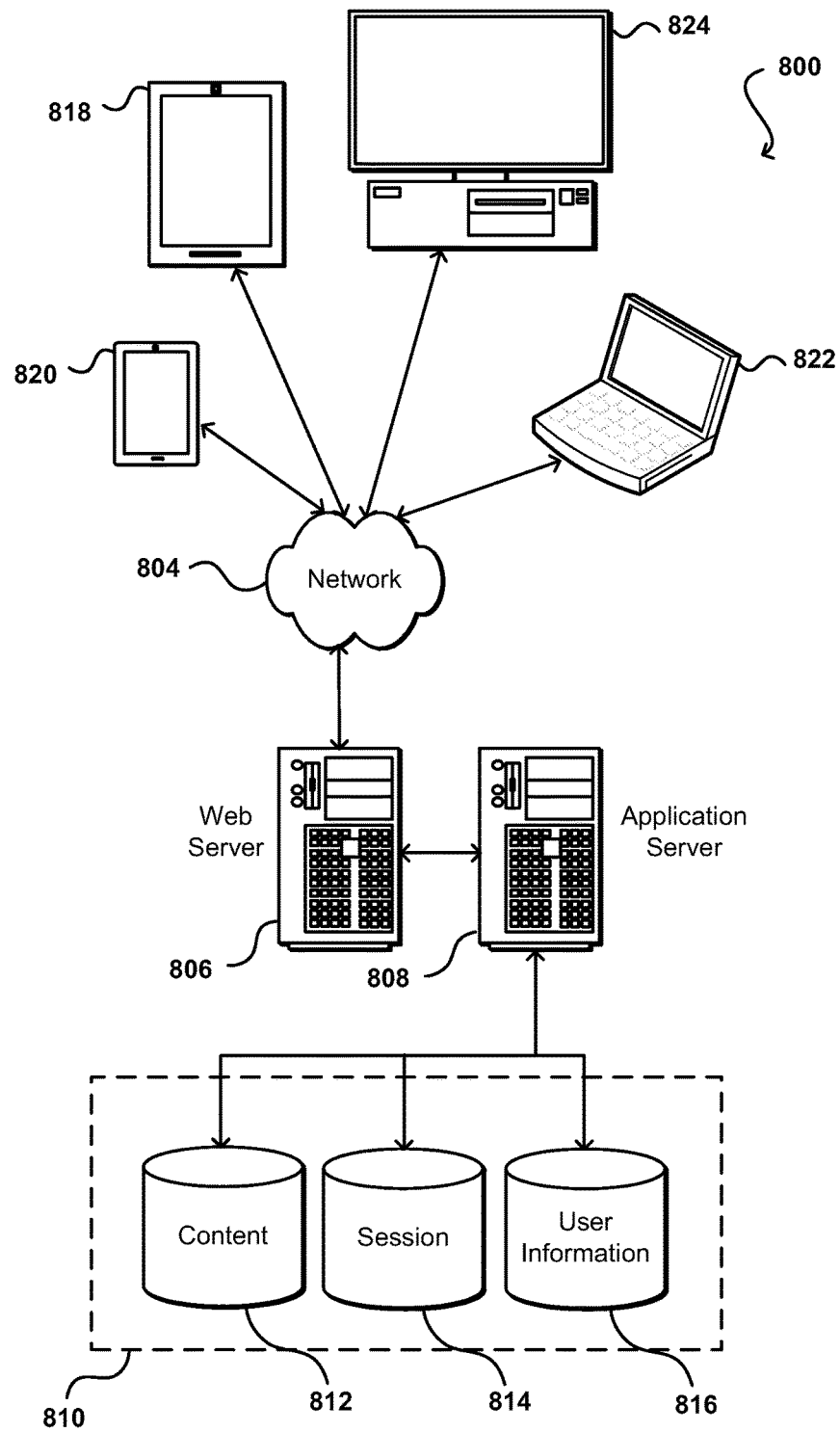
FIG. 8 illustrates an example of an environment for implementing aspects in accordance with various embodiments.

As discussed, different approaches can be implemented in various environments in accordance with the described embodiments. For example, FIG. 8 illustrates an example of an environment 800 for implementing aspects in accordance with various embodiments. As will be appreciated, although a Web-based environment is used for purposes of explanation, different environments may be used, as appropriate, to implement various embodiments. The system includes an electronic client device (818, 820, 822, 824), which can include any appropriate device operable to send and receive requests, messages or information over an appropriate network 804 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 806 for receiving requests and serving content in response thereto, although for other networks, an alternative device serving a similar purpose could be used, as would be apparent to one of ordinary skill in the art.

The illustrative environment includes at least one application server 808 and a data store 810. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 808 can include any appropriate hardware and software for integrating with the data store 810 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 806 in the form of HTML, XML or another appropriate structured language in this example. The handling of all requests and responses, as well as the delivery of content between the client device (818, 820, 822, 824) and the application server 808, can be handled by the Web server 806. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing content (e.g., production data) 812 and user information 816, which can be used to serve content for the production side. The data store is also shown to include a mechanism for storing log or session data 814. It should be understood that there can be many other aspects that may need to be stored in the data store, such as page image information and access rights information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device (818, 820, 822, 824). Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method for enabling secure communications between computing devices, the method comprising:
   under control of one or more computer systems configured with executable instructions,
   receiving, at a first computing device associated with an intended receiver, a communication from a second computing device associated with an indicated sender, the communication associated with information about an actual sender of the communication captured by the second computing device at an approximate time of generating the communication, the information including at least one of an image of the actual sender, voice data captured of the actual sender, or typing pattern information of the actual sender;
   identifying, using the communication, profile data associated with the indicated sender;
   determining a level of similarity between the information of the actual sender and the profile data associated with the indicated sender;
   generating a confidence value for the communication based on the level of similarity, the confidence value represents a metric that indicates a likelihood that the actual sender is same as the indicated sender, wherein an increase in the level of similarity corresponds to an increase in the confidence value;
   determining the confidence value is less than a threshold value;
   receiving additional information about the actual sender;
   modifying the confidence value based at least in part on the additional information; and
   displaying, by the first computing device, the communication and a graphical indication of the confidence value.

2. The computer implemented method of claim 1, further comprising:
   receiving, at the first computing device, a request for authentication of the intended receiver to display the communication;
   receiving identification information about the intended receiver at the first computing device; and
   causing, based at least in part on the identification information, the communication to be displayed at the first computing device.

3. A computer implemented method, comprising:
   under the control of one or more computer systems configured with executable instructions,
   receiving, at a first computing device associated with an intended receiver, a communication from a second computing device associated with an indicated sender, the communication including information about an actual sender of the communication captured by the second computing device at an approximate time of generating the communication;
   identifying, using the communication, data associated with the indicated sender;

determining a level of similarity between the information of the actual sender and the data associated with the indicated sender of the communication;

generating a confidence value for the communication based on the level of similarity, the confidence value represents a metric that indicates a likelihood the actual sender is same as the indicated sender, wherein an increase in the level of similarity corresponds to an increase in the confidence value;

determining the confidence value is less than a threshold value;

requesting additional information about the actual sender;

modifying the confidence value based at least in part on the additional information; and displaying, by the first computing device, the communication and a graphical indication of the confidence value.

4. The computer implemented method of claim 3, wherein the information captured by the second computing device includes at least one of an image of the actual sender, voice data captured of the actual sender, a location of the actual sender, a time stamp corresponding to the approximate time, or typing pattern information of the actual sender.

5. The computer implemented method of claim 3, further comprising:

generating a request for the additional information, the request to be communicated to the actual sender of the communication.

6. The computer implemented method of claim 3, further comprising:

receiving a plurality of communications from the second computing device, each communication including information captured by the second computing device about the actual sender of said each communication;

generating an additional confidence value for each of the plurality of communications;

determining, based at least in part on the additional confidence value for each of the plurality of communications, a baseline confidence value for a subsequent communication from the second computing device, the subsequent communication includes information captured by the second computing device; and displaying, by the first computing device, the subsequent communication and a second graphical indication of the baseline confidence value.

7. The computer implemented method of claim 3, further comprising:

providing at least one user-selectable element that corresponds to a plurality of options associated with the graphical indication of the confidence value;

receiving a selection of the at least one user-selectable element indicative of one of the plurality of options; and performing the one of the plurality of options.

8. The computer implemented method of claim 3, further comprising:

retrieving data from one of a third party network, a remote database, and one or more computing devices.

9. A computing system, comprising:

at least one processor; and a memory including instructions that, when executed by the at least one processor, cause the at least one processor to:

receive, at a first computing device associated with an intended receiver, a communication from a second computing device associated with an indicated sender, the communication including information about an actual sender of the communication captured by the second computing device at an approximate time of generating the communication;

identify, using the communication, data associated with the indicated sender;

determine a level of similarity between the information of the actual sender and the data associated with the indicated sender of the communication;

generate a confidence value for the communication based on the level of similarity, the confidence value represents a metric that indicates a likelihood the actual sender is same as the indicated sender, wherein an increase in the level of similarity corresponds to an increase in the confidence level;

determine the confidence value is less than a threshold value;

request additional information about the actual sender;

modify the confidence value based at least in part on the additional information; and display, by the first computing device, the communication and a graphical indication of the confidence value.

10. The computing system of claim 9, wherein the information captured by the second computing device includes at least one of an image of the actual sender, a location of the actual sender, a time stamp corresponding to the approximate time, voice data captured of the actual sender, or typing pattern information of the actual sender.

11. The computing system of claim 9, wherein the at least one processor receives the communication and determines the level of similarity locally on the first computing device.

12. The computing system of claim 9, wherein the instructions, when executed by the at least one processor, further cause the at least one processor to:

receive a request for authentication of the intended receiver to view the communication;

receive identification information about the intended receiver; and cause, based at least in part on the input of the identification information, display of the communication at the first computing device.

13. The computing system of claim 9, wherein a third party network receives the information captured by the second computing device, determines the level of similarity, and provides the graphical indication of the confidence value to the first computing device.

14. The computing system of claim 9, wherein the instructions, when executed by the at least one processor, further cause the at least one processor to:

generate a request for the additional information, the request to be communicated to the actual sender of the communication.

15. The computing system of claim 9, wherein instructions, when executed by the at least one processor, further cause the at least one processor to:

provide at least one user-selectable element that corresponds to a plurality of options associated with the graphical indication of the confidence value;

receive a selection of the at least one user-selectable element indicative of one of the plurality of options; and perform the one of the plurality of options.

16. A non-transitory computer readable storage medium storing one or more sequences of instructions executable by one or more processors to perform a set of operations comprising:

receiving, at a first computing device associated with an intended receiver, a communication from a second computing device associated with an indicated sender, the communication including information about an actual sender of the communication captured by the second computing device at an approximate time of generating the communication;

identifying, using the communication, data associated with the indicated sender;

determining a level of similarity between the information of the actual sender and the data associated with the indicated sender of the communication;

generating a confidence value for the communication based on the level of similarity, the confidence value represents a metric that indicates a likelihood that the actual sender is same as the indicated sender, wherein an increase in the level of similarity corresponds to an increase in the confidence value;

determining the confidence value is less than a threshold value;

receiving additional information about the actual sender;

modifying the confidence value based at least in part on the additional information; and displaying, by the first computing device, the communication and a graphical indication of the confidence value.

17. The non-transitory computer readable storage medium of claim 16, wherein the instructions executable by the one or more processors further cause the one or more processors to perform the operations of:

receiving, at the first computing device, a request for authentication of the intended receiver to receive the communication;

receiving identification information about the intended receiver at the first computing device; and causing, based at least in part on the identification information, the communication to be displayed at the first computing device.

18. The non-transitory computer readable storage medium of claim 16, wherein the instructions executable by the one or more processors further cause the one or more processors to perform the operations of:

retrieving data associated with the indicated sender from one of a third party network, a remote database, or one or more computing devices.

19. The non-transitory computer readable storage medium of claim 16, wherein the instructions executable by the one or more processors, further cause the one or more processors to perform the operations of:

comparing the confidence value to the threshold value; and generating a request for additional information, the request to be communicated to the actual sender of the communication.

20. The non-transitory computer readable storage medium of claim 16, wherein the instructions executable by the one or more processors further cause the one or more processors to perform the operations of:

retrieving additional information associated with the actual sender of the communication, wherein the additional information is one of a location of the actual sender or a time stamp corresponding to the approximate time.

21. The non-transitory computer readable storage medium of claim 16, wherein the information captured by the second computing device includes at least one of an image of the actual sender, voice data captured of the actual sender, or typing pattern information of the actual sender.

22. A computing system, comprising:

at least one processor; and a memory including instructions that, when executed by the at least one processor, cause the at least one processor to:

generate a communication for an indicated sender associated with a second computing device for delivery to a first computing device associated with an intended receiver, the communication including information about an actual sender of the communication captured at an approximate time of generating the communication;

identify, using the communication, data associated with the indicated sender;

determine a level of similarity between the information of the actual sender and the data associated with the indicated sender of the communication;

generate a confidence value for the communication based on the level of similarity, the confidence value represents a metric that indicates a likelihood that the actual sender of the communication is the indicated sender, wherein an increase in the level of similarity corresponds to an increase in the confidence value;

determining the confidence value is less than a threshold value;

receiving additional information about the actual sender;

modifying the confidence value based at least in part on the additional information; and send the communication and the confidence value to the first computing device to cause the first computing device to display the communication and a graphical indication of the confidence value.

23. The computing system of claim 22, wherein the information captured about the actual sender includes at least one of an image of the actual sender, a location of the actual sender, a time stamp corresponding to the approximate time, voice data captured of the actual sender, or typing pattern information of the actual sender.

24. The computing system of claim 22, wherein the instructions, when executed by the at least one processor, further cause the at least one processor to:

generate a request for the additional information, the request to be communicated to the actual sender of the communication.

* * * * *